US009478147B2

(12) United States Patent
Gifford et al.

(10) Patent No.: US 9,478,147 B2
(45) Date of Patent: Oct. 25, 2016

(54) METHODS AND APPARATUS FOR INTERPERSONAL COORDINATION ANALYSIS AND TRAINING

(71) Applicant: THE UNIVERSITY OF CONNECTICUT, Farmington, CT (US)

(72) Inventors: Timothy Gifford, Hartford, CT (US); Anjana Bhat, Storrs, CT (US); James Dixon, Storrs, CT (US); Kerry Marsh, Manchester, CT (US)

(73) Assignee: The University of Connecticut, Farmington, CT (US)

( * ) Notice: Subject to any disclaimer, the term of this patent is extended or adjusted under 35 U.S.C. 154(b) by 149 days.

(21) Appl. No.: 13/894,846

(22) Filed: May 15, 2013

(65) Prior Publication Data

US 2013/0323698 A1 Dec. 5, 2013

Related U.S. Application Data

(60) Provisional application No. 61/648,108, filed on May 17, 2012.

(51) Int. Cl.
G09B 19/00 (2006.01)
(52) U.S. Cl.
CPC ..................... G09B 19/00 (2013.01)
(58) Field of Classification Search
CPC ................. A63B 21/00178; G09B 19/00
USPC ............................................. 434/247
See application file for complete search history.

(56) References Cited

U.S. PATENT DOCUMENTS 5,481,652 A 1/1996 Sasaki
5,506,939 A 4/1996 Sasaki
5,722,418 A 3/1998 Bro
7,567,693 B2 7/2009 deCharms
(Continued)

FOREIGN PATENT DOCUMENTS

WO 2007047965 4/2007
WO 2011024134 3/2011

OTHER PUBLICATIONS

Gifford, T. et al, Using Robots to Teach Musical Rhythms to Typically Developing Children and Children with Autism. International Conference on Education/Training Systems, Methodologies and Technologies (Jun. 13, 2011).*

(Continued)

Primary Examiner — Robert J Utama
Assistant Examiner — Thomas Hong
(74) Attorney, Agent, or Firm — Lipsitz & McAllister, LLC

(57) ABSTRACT

Methods and systems for interpersonal coordination analysis and training are provided. In an example embodiment of a method for interpersonal coordination analysis and training, at least one physical action is selected to be performed. A leader subject is instructed to perform the at least one physical action in the presence of at least one follower subject. The at least one physical action of the leader subject is tracked. The at least one follower subject is instructed to mimic the at least one physical action of the leader subject. The at least one physical action of the at least one follower subject is tracked. Tracking data obtained from the tracking of the leader subject and the at least one follower subject is analyzed. From the analyzing of the tracking data, a responsiveness of the at least one follower subject to mimic the leader subject can be determined.

15 Claims, 2 Drawing Sheets

(56) References Cited

U.S. PATENT DOCUMENTS

| | | |
|---|---|---|
| 8,001,067 B2 | 8/2011 | Visel et al. |
| 2003/0028327 A1 | 2/2003 | Brunner et al. |
| 2004/0107413 A1 | 6/2004 | Bixler |
| 2005/0224084 A1 | 10/2005 | Leinbach |
| 2006/0012120 A1 | 1/2006 | Kash et al. |
| 2007/0117073 A1 | 5/2007 | Walker et al. |
| 2007/0180428 A1 | 8/2007 | Behrmann et al. |
| 2009/0055019 A1* | 2/2009 | Stiehl et al. ............ 700/249 |
| 2009/0111074 A1 | 4/2009 | Shahal |
| 2010/0016677 A1 | 1/2010 | Oetringer et al. |
| 2010/0105526 A1 | 4/2010 | Hautoplund |
| 2010/0111359 A1 | 5/2010 | Bai et al. |
| 2010/0233662 A1 | 9/2010 | Casper |
| 2011/0066003 A1 | 3/2011 | Duffy |
| 2012/0314045 A1 | 12/2012 | Billard et al. |
| 2013/0078600 A1* | 3/2013 | Fischer et al. ............ 434/236 |

OTHER PUBLICATIONS

Fischer, K. (2011). Interpersonal variation in understanding robots as social actors. In Proceedings of the 6th International Conference on Human-Robot Interaction (HRI). ACM. http://dx.doi.org/10.1145/1957656.1957672.*

Fischer, K., & Lohse, M. (2007). Shaping naive users' models of robots' situation awareness. In 16th IEEE International Symposium on Robot and Human Interactive Communication (Ro-MAN) (pp. 534-539). IEEE. http://dx.doi.org/10.1109/ROMAN.2007.4415144.*

Time-of-flight camera, Aug. 9, 2010, www.archive.org, [retrieved on Jan. 9, 2015]. Retrieved from the Internet <URL: https://web.archive.org/web/20100809133756/http://en.wikipedia.org/wiki/Time-of-flight_camera>.*

Detrended fluctuation analysis, May 4, 2009, www.archive.org, [retrieved on Jan. 9, 2015]. Retrieved from the Internet <URL: https://web.archive.org/web/20090504083438/http://en.wikipedia.org/wiki/Detrended_fluctuation_analysis>.*

S. Srinivasan, K. Lynch, T. Gifford, D. Bubela and A. Bhat, The Effects of Robot-Child Interactions on Imitation and Praxis Performance of Typically Developing (TD) Children and Children with Autism Spectrum Disorders (ASDs) Between 4-10 Years of Age, International Society for Autism Research, May 12, 2011.*

Gifford, T. , Srinivasan, S., Kaur, M., Dotov, D., Wanamaker C., Dressler G., Marsh K., & Bhat, A. (Dec. 2011). Using robots to teach musical rhythms to typically developing children and children with autism. Talk presented virtually at the International Conference on Education, Informatics, and Cybernetics: icEIC 2011, Orlando, FL.*

Kirschner, S.,Tomasello,M. (2009),Joint drumming: Social context facilitates synchronization in preschool children. Journal of Experimental Psychology 102. 299-314.*

Tapus, et al., "Socially Assistive Robotics—The Grand Challenges in Helping Humans Through Social Interaction", IEEE Robotics and Automation Magazine, pp. 35-42, Mar. 2007.

Michalowski, et al.,"A Dancing Robot for Rhythmic Social Interaction", HRI'07, pp. 89-96, Mar. 2007.

Scassellati et al., "How social robots will help us diagnose, treat, and understand autism," in 12th International Symposium of Robotics Research (ISRR), 11 pages, 2005.

B. Scassellati, "Quantitative Metrics of Social Response for Autism Diagnosis", Department of Computer Science, Yale University, New Haven, CT, 6 pages, date unknown.

Billard, et al., "Building Robota, a Mini-Humanoid Robot for the Rehabilitation of Children with Autism", RESNA Assistive Technology Journal, 21 pages, 2006.

* cited by examiner

METHODS AND APPARATUS FOR INTERPERSONAL COORDINATION ANALYSIS AND TRAINING

The present application claims the benefit of U.S. provisional application No. 61/648,108 filed on May 17, 2012, which is incorporated herein by reference in its entirety and for all purposes.

TECHNICAL FIELD

The present disclosure relates generally to systems for interpersonal coordination analysis. More particularly, the present disclosure relates to systems, devices, and methods employing robot-assisted therapy and training for assessing and improving the social aspects and cognitive development of humans, particularly with regard to children, in real time.

BACKGROUND

The coordination of a person's actions with those of another person is one manner by which social and cognitive skills can be developed. Interpersonal synchrony can be systematized through repetitive behavior like drumming or clapping. This behavior can be tracked or monitored to determine the level of synchrony and coordination between members of a group.

It would be advantageous to enable improvement of social and cognitive skills of an individual, in particular a child, via the use of robot-assisted therapies, which have been shown to have positive effects for both typically developing (TD) children and children with various disorders. Such robot-assisted therapies are well-suited to the assessment of the proficiency of a child with regard to activities that involve interpersonal synchrony, which is the coordinated occurrence, arrangement, or treatment related to body movements and/or motor behavior. It would also be advantageous if the repetitive behavior, when used in an interactive manner with more than two children and/or in conjunction with robot-assisted therapy, can then be used to improve social and cognitive skills and motor behavior in TD children as well as children with autism spectrum disorders (ASD).

The methods and systems of the present invention provide the foregoing and other advantages.

SUMMARY

The present invention provides methods and systems for interpersonal coordination analysis and training. In an example embodiment of a method for interpersonal coordination analysis and training in accordance with the present invention, at least one physical action is selected to be performed. A leader subject is instructed to perform the at least one physical action in the presence of at least one follower subject. The at least one physical action of the leader subject is tracked. The at least one follower subject is instructed to mimic the at least one physical action of the leader subject. The at least one physical action of the at least one follower subject is also tracked. Tracking data obtained from the tracking of the leader subject and from the tracking of the at least one follower subject is analyzed. From the analyzing of the tracking data, a responsiveness of the at least one follower subject to mimic the leader subject can be determined.

The leader subject may repeatedly perform, and the at least one follower subject in turn may repeatedly mimic, one of the at least one physical actions. The tracking data may be continuously analyzed and the responsiveness may be continuously determined during interactions between the leader and the at least one follower subject.

The method may further comprise altering the at least one physical action of the leader subject based on the responsiveness. For example, the altering may comprise a role reversal between the leader subject and the at least one follower subject. Further, the altering may comprise at least one of: changing a frequency of the at least one physical action; changing a sequence of movements of the at least one physical action; and changing the at least one physical action.

The tracking data may be recorded as at least one time series. The responsiveness may be determined for each of the at least one time series.

In one example embodiment of the method, interpersonal synchrony between the leader and the at least one follower subject may be determined using Multifractal Detrended Fluctuation Analysis. Hurst exponents may be computed for each scale of the at least one time series for the leader subject and the follower subject. A first vector of Hurst exponents may be computed for the leader subject. A second vector of Hurst exponents may be computed for the follower subject. Vector autoregression and vector error-correction models may be used to predict future activity of the follower subject.

The leader subject may be a robot and the at least one follower subject may be a human. Conversely, the leader subject may be human and the at least one follower subject may be a robot.

The selecting of the at least one physical action may be performed by the leader subject. Alternatively, the selecting of the at least one physical action may be performed by an independent operator and instructions for the at least one physical action may be provided to the leader subject by the operator. The operator may comprise a human attendant.

In addition to the tracking data, data may be manually provided by the operator and used in the determining of the responsiveness.

The tracking includes position detection using position detection devices comprising at least one of (i) time-of-flight cameras, and (ii) electromagnetic position and orientation trackers mounted on at least one of the leader subject and the follower subject.

The responsiveness may be used to assess a level of interpersonal synchrony and coordination exhibited by the at least one follower subject. Techniques to determine the responsiveness may comprise at least one of Cross-Recurrence Quantification Analysis (CRQA), Multifractal Detrended Fluctuation Analysis (MFDFA), epoching, and the like.

The interpersonal coordination analysis may be applied to therapeutic treatment of human cognitive development disorders.

The analyzing of the tracking data may occur in real-time.

The at least one physical action may comprise a series of rhythmic actions.

The present invention also encompasses a system for carrying out the method. An example embodiment of a system for interpersonal coordination analysis and training may comprise at least one tracking device for tracking physical action, at least one processing device, and a robot capable of mimicking a plurality of human physical actions. The processing device is adapted for analyzing tracking data from the at least one tracking device and determining responsiveness of a human subject during interaction with the robot. The responsiveness may be used to assess interpersonal synchrony and coordination of the human subject.

The system is also adapted to carry out the various features of the method embodiments discussed above.

BRIEF DESCRIPTION OF THE DRAWINGS

The present invention will hereinafter be described in conjunction with the appended drawing figures.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
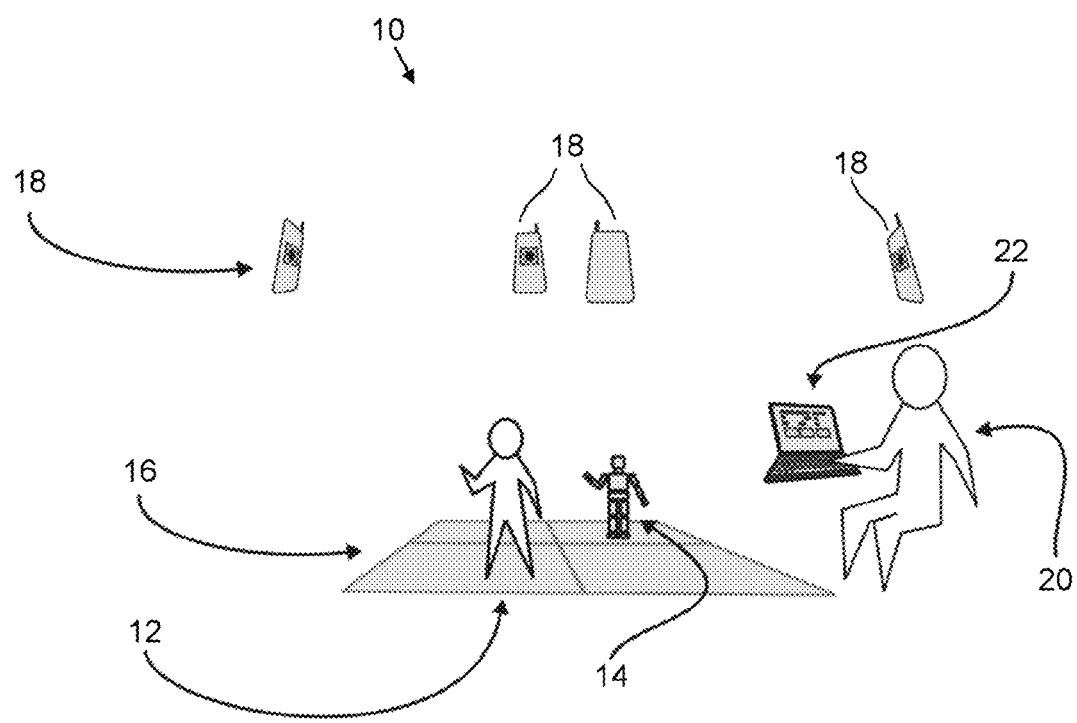
FIG. 1 is a schematic diagram of an example embodiment of the present invention.

As shown in FIG. 1, an example embodiment of a system for developing interpersonal coordination, particularly with regard to children, is designated generally by the reference number 10 and is hereinafter referred to as "system 10." In system 10, one or more subjects 12 and a leader subject 14, such as a robot, are placed within a test area 16 capable of being surveyed by one or more tracking devices 18. The subject 12 may be a child that is either typically developing or one having a disorder such as ASD, and the robot 14 may comprise an automated humanoid device that is capable of dynamically interacting with the child. The tracking devices 18 may comprise time-of-flight cameras, electromagnetic position and orientation trackers mounted on the subject 12, the robot 14, or both, or other devices capable of capturing and recording the motions of the subject 12 and the robot 14 (now existing or to be developed). An operator 20 oversees and conducts the operation of the system 10 and enters data derived from the operation of the system 10 into an electronic processing device 22 such as a computer.

In accordance with an example embodiment of the present invention, at least one physical action is selected to be performed (e.g., by the operator 20 or by a leader subject). The leader subject, which may be a robot 14, is instructed to perform the at least one physical action in the presence of at least one follower subject 12. The at least one physical action of the leader subject is tracked (e.g., by tracking devices 18, as discussed in more detail below). The at least one follower subject 12 is instructed to mimic the at least one physical action of the leader subject 14. The at least one physical action of the at least one follower subject 12 is tracked. Tracking data obtained from the tracking of the leader subject and the at least one follower subject 12 is analyzed (e.g., by the processing device 22). From the analyzing of the tracking data, a responsiveness of the at least one follower subject 12 to mimic the leader subject 14 can be determined.

The leader subject 14 may repeatedly perform, and the at least one follower subject 12 in turn may repeatedly mimic, one of the at least one physical actions. The tracking data may be continuously analyzed and the responsiveness may be continuously determined during interactions between the leader 14 and the at least one follower subject 12. The analyzing of the tracking data by the processing device 22 may occur in real-time.

The method may further comprise altering the at least one physical action of the leader subject 14 based on the responsiveness. For example, the altering may comprise a role reversal between the leader subject 14 and the follower subject 12. Further, the altering may comprise at least one of: changing a frequency of the at least one physical action; changing a sequence of movements of the at least one physical action; changing the at least one physical action; and the like.

The tracking data may be recorded as at least one time series. The responsiveness may be determined for each of the at least one time series.

In one example embodiment of the present invention, interpersonal synchrony between the leader 14 and each of the at least one follower subjects 12 may be determined using Multifractal Detrended Fluctuation Analysis. Hurst exponents may be computed for each scale of the at least one time series for the leader subject 14 and the follower subject 12. A first vector of Hurst exponents may be computed for the leader subject. A second vector of Hurst exponents may be computed for the follower subject 12. Vector autoregression and vector error-correction models may be used to predict future activity of the follower subject 12. Multifractal Detrended Fluctuation Analysis techniques are discussed in more detail below. Those skilled in the art will appreciate that other methods of analysis may be used in connection with the present invention.

The leader subject 14 may be a robot and the at least one follower subject 12 may be a human. Conversely, the leader subject 14 may be human and the at least one follower subject 12 may be a robot.

The selecting of the at least one physical action may be performed by the leader subject 14. Alternatively, the selecting of the at least one physical action may be performed by an independent operator 20 and instructions for the at least one physical action may be provided to the leader subject 14 by the operator 20. The operator 20 may comprise a human attendant.

In addition to the tracking data, data may be manually provided to the processing device 22 by the operator 20 and used in the determining of the responsiveness.

The tracking includes position detection using position detection devices 18 comprising at least one of (i) time-of-flight cameras, and (ii) electromagnetic position and orientation trackers mounted on at least one of the leader subject 14 and the follower subject 12. Those skilled in the art will appreciate that the type of tracking device used is not material to the present invention, and that any tracking device now known or to be developed that can follow the movements of the subject 12, 14 and provide data on these movements to the processing device 22, can be used with the methods and systems of the present invention.

The responsiveness may be used to assess a level of interpersonal synchrony and coordination exhibited by the at least one follower subject 12. Techniques to determine the responsiveness may comprise at least one of Cross-Recurrence Quantification Analysis (CRQA), Multifractal Detrended Fluctuation Analysis (MFDFA), epoching, and the like, as discussed in detail below.

The interpersonal coordination analysis may be applied to therapeutic treatment of human cognitive development disorders.

Figure 2:
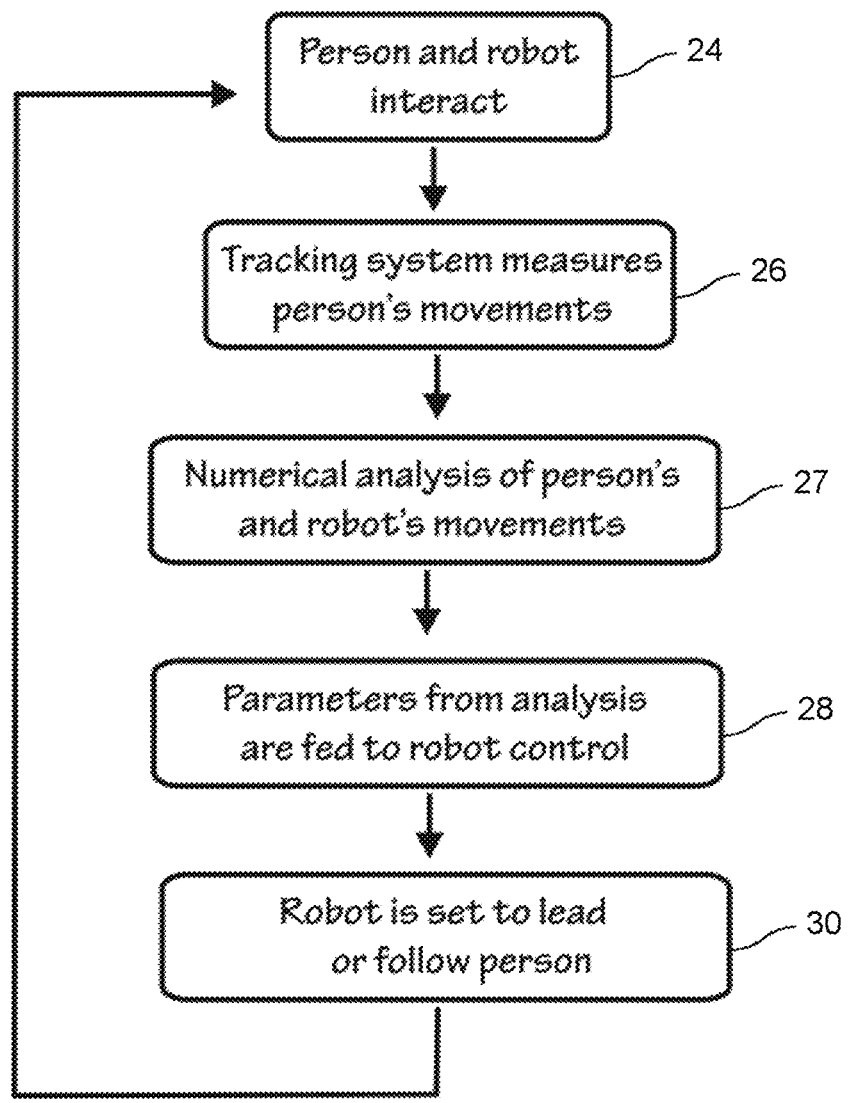
FIG. 2 is a flow diagram illustrating operation of an example embodiment of the present invention.

FIG. 2 shows a flow diagram of the operation of an example embodiment of the system 10. The process is initiated by an interaction step 24. In the interaction step 24, the operator 20 instructs the subject 12 to follow actions performed by the robot 14. The present invention is not limited in this regard, however, as the robot 14 may alternatively or additionally provide the instruction. The robot 14, which is configured to engage the subject 12, may set the timing of interaction between the robot 14 and the subject 12, and then may execute a series of rhythmic actions that the subject 12 is expected to follow. Such rhythmic actions may include, but are not limited to, marching, clapping, playing drums, and the like. Any action (or inaction) by the subject 12 is surveyed by the tracking device 18, as indicated in a tracking step 26. In the tracking step 26, data pertaining to whether the subject 12 is responsive to the instruction (and the extent of the responsiveness) is collected.

If the subject 12 exhibits behavior that is suitably responsive to the instructions provided by the operator 20 and/or the robot 14, the frequency of the actions of the robot 14 may be varied over time. The behavior of the subject 12 relative to the robot 14 is further surveyed by the tracking device 18, and the collected data pertaining to the behavior is recorded on the electronic processing device 22. Data may also be input to the electronic processing device 22 by the operator 20. The data may be transferred directly from the tracking device 18 to the electronic processing device 22 via a wire or wireless communication link.

If the subject 12 is responsive to the instructions provided, thus allowing the frequency of the actions of the robot 14 to be varied over time, the collected data are recorded as a time series. An analysis of the time series in an analysis step 27 in real time indicates whether the subject 12 is following the behavior of the robot 14 to some pre-defined acceptable degree. Parameters from the analysis step 27 are then passed to the robot 14 in a passing step 28. In a control switching step 30, if the subject 12 is suitably following the behavior of the robot 14, the operator 20 or the robot 14 instructs the subject 12 to provide leading behavior for the robot 14 to follow. The roles of leader and follower are then reversed, and the operation of the robot 14 is altered to respond to the actions of the subject 12. This provides training for the subject 12 in interpersonal coordination and synchrony. Whether the subject 12 or the robot 14 is leading, control is passed back to the interaction step 24 in which the subject 12 and the robot 14 interact.

The collected and recorded data is continuously analyzed in real time to determine the level of interpersonal synchrony and coordination exhibited by the subject(s) 12. The present invention is not limited to continuous analysis in real time, however, as the collected data may be analyzed off-line. In any embodiment, however, any of several analytical techniques can be used to investigate the synchrony. In one exemplary embodiment of the system 10 employing real time analysis, the synchrony is investigated using Cross-Recurrence Quantification Analysis (CRQA). In CRQA, various aspects of the coordination between two time series are quantified. In such a quantification, the two time series are embedded in a single reconstructed phase space. The number of instances for which locations are shared by the two time series is tallied. A mean line, which is a measure of the amount of time during which the two systems are very close together (within a selected range) in the single reconstructed phase space is also determined. From the tally of the number of shared locations and the mean line, the number and duration of recurrences derived from the collected and recorded data are quantified and used to measure the level of interpersonal synchrony exhibited by the subject 12. Epoching procedures may be used to preserve the continuity of recurrence trends over time by observing smaller windows within one time series. For example, in one particular collection and recordation of data in the use of the system 10, the length of the time series was 4,800 data points, and each smaller window consisted of 1,000 data points and overlapped adjacent windows by 20%.

In another exemplary embodiment of the system 10, the interpersonal synchrony of a subject 12 is investigated using Multifractal Detrended Fluctuation Analysis (MFDFA). MFDFA is an analytic technique that can be used to quantify the activity of biological systems at multiple temporal scales. From a univariate time series, MFDFA computes a Hurst exponent for each scale (the number of scales is specified, for example, by the operator of system 10). The Hurst exponent quantifies a power-law relationship between time and the amount of activity at that temporal scale.

With regard to system 10, a vector of Hurst exponents for the subject 12 is computed for each epoch (as with CRQA) Likewise, an analogous vector of Hurst exponents is computed for the robot 14. Vector autoregression and vector error-correction models are then used to investigate how the activity of the robot 14 and the subject 12 at each scale predicts the future activity of the subject 12 at those scales.

It should be appreciated by one of ordinary skill in the art that other analytical methods and tools may be used to analyze the collected data, such as multifractal analysis, and the like.

It should now be appreciated that the present invention provides advantageous methods and apparatus for interpersonal coordination analysis and training.

While the invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the foregoing description.

What is claimed is:

1. A method for interpersonal coordination analysis and training, comprising:
    selecting at least one physical action to be performed;
    instructing a leader subject to perform said at least one physical action in the presence of at least one follower subject;
    tracking said at least one physical action of said leader subject;
    instructing said at least one follower subject to mimic said at least one physical action of said leader subject;
    tracking the at least one physical action of said at least one follower subject;
    analyzing tracking data obtained from the tracking of the leader subject and the at least one follower subject; and
    determining, from the analyzing of the tracking data, a responsiveness of said at least one follower subject to mimic said leader subject;
    altering said at least one physical action of said leader subject based on said responsiveness, said altering comprising at least changing a frequency of said at least one physical action;
    wherein:
    said at least one physical action comprises a series of rhythmic actions comprising at least one of clapping, marching, and drumming;
    said responsiveness is used to assess a level of one of interpersonal synchrony or interpersonal coordination exhibited by the at least one follower subject;
    said leader subject is a robot;

the tracking data is recorded as at least one time series; and the responsiveness is determined for each of the at least one time series.

2. The method of claim 1, wherein:
the leader subject repeatedly performs, and the at least one follower subject in turn repeatedly mimics, one of the at least one physical actions; and
the tracking data is continuously analyzed and the responsiveness is continuously determined during interactions between the leader and the at least one follower subject.

3. The method of claim 1, wherein said altering further comprises a role reversal between the leader subject and the at least one follower subject.

4. The method of claim 1, wherein said altering further comprises at least one of:
changing a sequence of movements of said at least one physical action; and
changing said at least one physical action.

5. The method of claim 1, wherein:
the interpersonal synchrony between the leader and each of the at least one follower subject is determined using Multifractal Detrended Fluctuation Analysis;
Hurst exponents are computed for each scale of the at least one time series for the leader subject and the follower subject;
a first vector of Hurst exponents is computed for the leader subject;
a second vector of Hurst exponents is computed for the follower subject;
vector autoregression and vector error-correction models are used to predict future activity of the follower subject.

6. The method of claim 1, wherein said selecting of said at least one physical action is performed by said leader subject.

7. The method of claim 1, wherein said selecting at least one physical action is performed by an independent operator and instructions for said at least one physical action are provided to said leader subject by said operator.

8. The method of claim 7, wherein said operator comprises a human attendant.

9. The method of claim 8, wherein in addition to the tracking data, data is manually provided by the operator and used in the determining of the responsiveness.

10. The method of claim 1, wherein said tracking includes position detection using position detection devices comprising at least one of (i) time-of-flight cameras, and (ii) electromagnetic position and orientation trackers mounted on at least one of the leader subject and the follower subject.

11. The method of claim 1, wherein said responsiveness is used to assess the level of said interpersonal synchrony and the level of said interpersonal coordination exhibited by the at least one follower subject.

12. The method of claim 11, wherein techniques to determine said responsiveness comprise at least one of Cross-Recurrence Quantification Analysis (CRQA), Multifractal Detrended Fluctuation Analysis (MFDFA), and epoching.

13. The method of claim 1, wherein said interpersonal coordination analysis is applied to therapeutic treatment of human cognitive development disorders.

14. The method of claim 1, wherein said the analyzing of the tracking data occurs in real-time.

15. A system for interpersonal coordination analysis and training, comprising:
at least one tracking device for tracking physical action of a human subject;
at least one processing device; and
a robot capable of mimicking a plurality of human physical actions;
wherein:
the processing device is adapted for analyzing tracking data from said at least one tracking device, determining a responsiveness of the human subject to mimic the physical actions of said robot during interaction with said robot, and altering at least one physical action of the plurality of human physical actions mimicked by the robot based on said responsiveness by at least changing a frequency of said at least one physical action;
said at least one physical action comprises a series of rhythmic actions comprising at least one of clapping, marching, and drumming;
said responsiveness is used to assess a level of one of interpersonal synchrony or interpersonal coordination of said human subject;
the tracking data is recorded as at least one time series; and
the responsiveness is determined for each of the at least one time series.

* * * * *